Feb. 16, 1943.  H. C. CAMPBELL  2,311,365
POULTRY PICKING MACHINE
Filed Oct. 17, 1940  2 Sheets-Sheet 1
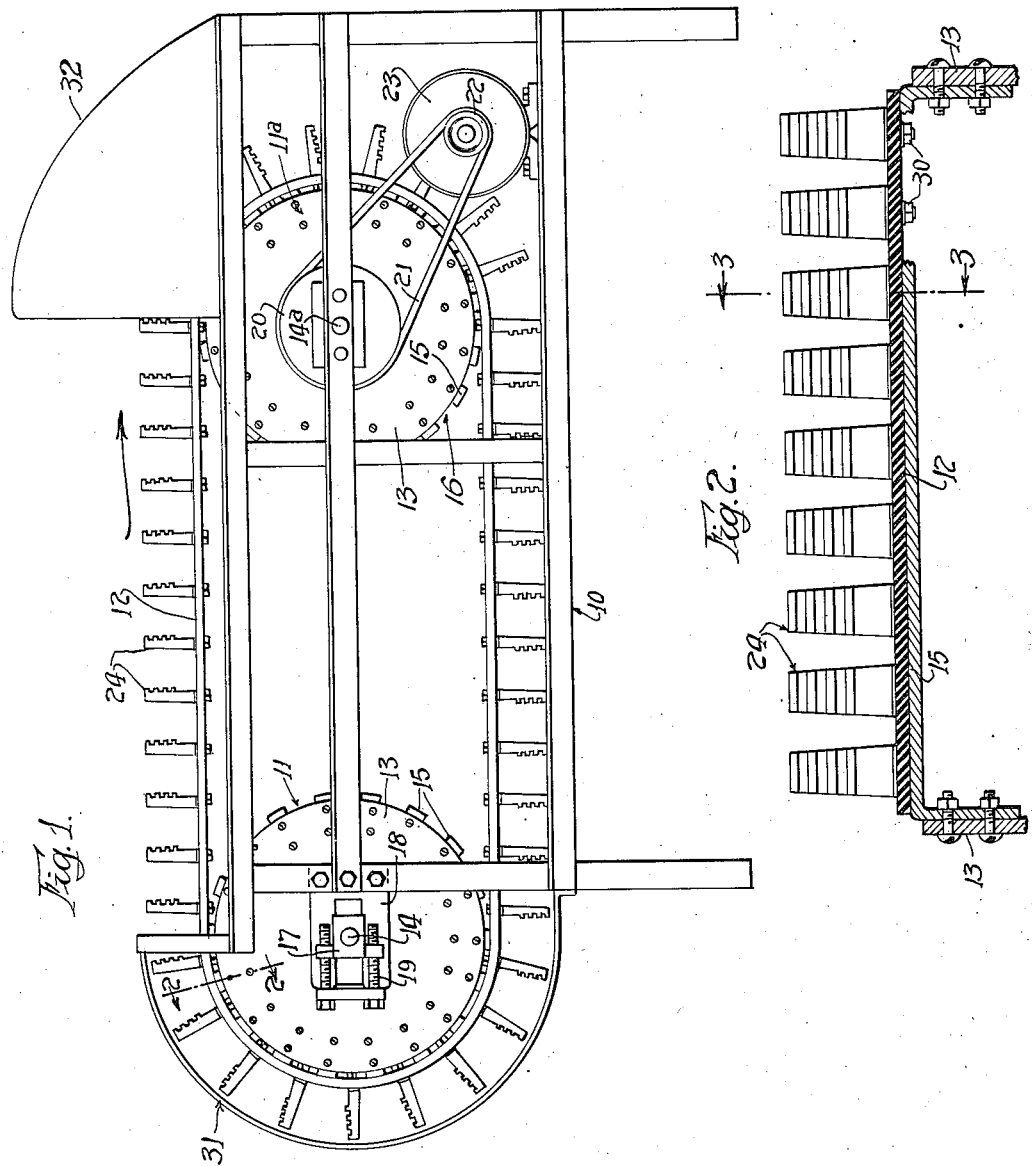
Witness:
E. Camporini
Inventor:
Harold C. Campbell,
By: Arthur M. Nelson
Attorney.

Feb. 16, 1943.     H. C. CAMPBELL     2,311,365
POULTRY PICKING MACHINE
Filed Oct. 17, 1940     2 Sheets-Sheet 2
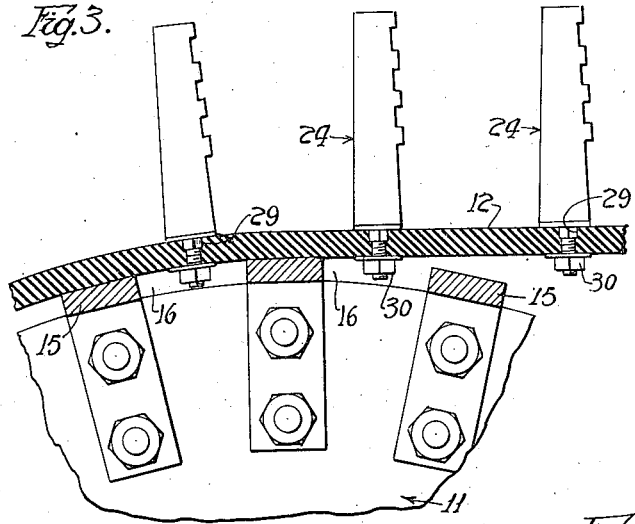
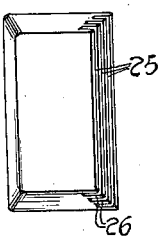
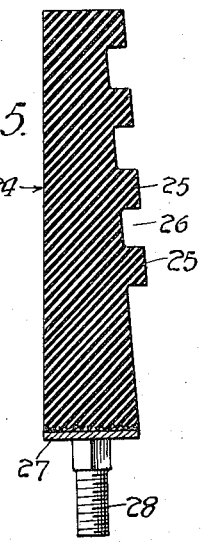
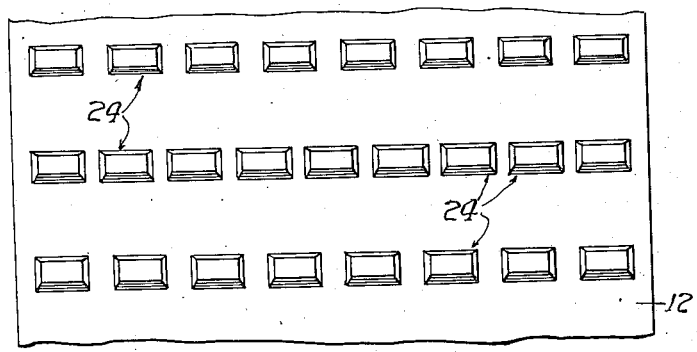
Inventor:
Harold C. Campbell,
By: Arthur W. Nelson
Attorney.
Witness:
E. Camporini Patented Feb. 16, 1943

2,311,365

UNITED STATES PATENT OFFICE 2,311,365

POULTRY PICKING MACHINE

Harold C. Campbell, Ashley, Ohio, assignor to The Ashley Machine Company, Piqua, Ohio, a corporation of Ohio Application October 17, 1940, Serial No. 361,482

18 Claims. (Cl. 17—11.1)

This invention relates to improvements in poultry picking machines and it consists of the matters hereinafter described and more particularly pointed out in the appended claims.

The machine with which the present invention is more especially concerned is of the kind that includes rubber picking elements having projections frictionally to engage the feathers of the fowl and pull them from the skin, as distinguished from those elements which mechanically nip or pinch the feathers and then pull them from the skin.

One of the objects of the invention is to provide a poultry picking machine which, while relatively small in size, provides a moving picking surface of large area so that more than one operator may be accommodated at a time.

Another object of the invention is to provide a machine of this kind operating upon the principle of a moving endless belt instead of a rotating cylinder so that the floor space occupied thereby is relatively small even though more than one operator may be accommodated.

A further object of the invention is to provide a machine of this kind that includes a novel flexible picking element, so formed as to have a relatively large frictional gripping surface for its size and therefore well adapted for plucking feathers from fowl such as ducks having feathers and underdown that are difficult to pluck or pick, even by hand.

Also, it is an object of the invention to provide a machine of this kind which may be readily cleaned, may be driven at a relatively high speed and yet is simple in construction for low cost production and is trouble-free in operation.

Again, it is an object of the invention to provide a machine which is efficient in picking poultry initially prepared by the semi-scald method as well as poultry initially prepared by the so-called hard-scald method.

The above mentioned objects of the invention, as well as others, together with the several advantages thereof will more fully appear as the specification proceeds.

In the drawings:

Fig. 1 is a view in side elevation of a poultry picking machine embodying the preferred form of the invention.

Fig. 2 is a transverse detail vertical sectional view, on an enlarged scale, through the improved machine as taken on the line 2—2 of Fig. 1, certain of the elements being shown in elevation.

Fig. 3 is a longitudinal vertical detail sectional view, on a further enlarged scale, as taken on the line 3—3 of Fig. 2.

Fig. 4 is a fragmentary top plan view of a part of the endless belt of the improved machine and illustrates more specifically the staggered arrangement of the picking elements thereon.

Fig. 5 is a longitudinal vertical sectional view through one of the picker elements on substantially a full size scale.

Fig. 6 is a top plan view of the picker element appearing in Fig. 5.

Fig. 7 is a view in side elevation of a modified form of picking element that may be advantageously used in the improved machine.

Referring now in detail to that embodiment of the invention illustrated in Figs. 1 to 6 inclusive of the accompanying drawings, 10 indicates as a whole one of a pair of side frames for the machine and which frames support a pair of longitudinally spaced, horizontally disposed cylinders 11 and 11a respectively, about which a relatively wide endless belt 12 is trained.

Each cylinder comprises a pair of spaced apart circular ends or heads 13 suitably secured to an associated shaft 14—14a respectively. The ends or heads of each cylinder are connected together by a plurality of bars 15 that are fixed at their ends to both heads in any suitable manner. These bars are so arranged circumferentially about the respective cylinders as to provide spaces or openings 16 therebetween, as best appears in Fig. 3.

The shaft 14 for the cylinder 11 is journalled at its ends in suitable bearing blocks 17 that slide in ways or guides 18 in the adjacent parts of the side frames. Associated with each block 17 are adjusting screws 19. When said screws are turned in one direction they will move the blocks 17 in their ways or guides away from the cylinder 11a. This will tension the endless belt so as to keep its top lap relatively straight in a horizontal plane.

In a full size operative machine, cylinders 11 and 11a having a diameter of about 18" and a length of about 23 or 24" have been found practical. As to the belt 12, one of rubberized fabric about ¼" thick suffices.

The drive for the cylinders 11 and 11a and the belt 12 may be of any conventional type. As best shown in Fig. 1, a pulley 20 is fixed to one end of the shaft 14a for the cylinder 11a and this pulley is driven by a belt 21 from a smaller pulley 22 on the armature shaft of an electric motor 23. A speed of about 400 R. P. M. for the cylinders gives a surface speed for the belt of about 1900 feet per minute. However, there may be some deviation from this speed without seriously affecting the practical operation of certain picker elements mentioned later on.

The belt 12 is provided on its outer surface with transverse rows of picker elements 24 and which rows are spaced apart longitudinally of the belt a distance equal to the peripheral arrangement of the spaces 16 between the bars 15 of both cylinders 11 and 11a. Preferably the elements 24 in the alternate rows are staggered with respect to those in the intermediate rows, as appears in Fig. 4.

In Fig. 5 one of the picker elements 24 is illustrated on substantially a full size scale. It is made of molded rubber having a hardness of 45 minus or plus two points, as shown by the Shore durometer.

Each finger, which is of a rectangular elongated form, has a length of about 3¼ inches and at its base is 1½" wide by ¾" deep and it tapers toward its top or tip end so as to there be 1¼" wide by ⅝" deep. On one of the wider faces of the element are four transverse ribs or projections 25 spaced longitudinally from the tip end of the element, and from each other by groove-like parts 26. A rib or projection ¼" wide with a spacing of about 5/16" between said ribs gives good practical results. The bottom or inner corner edge of each rib or projection constitutes the active picking part of the element. With these dimensions for the ribs and grooves mentioned, the corner edges cannot turn or curl over under the applied pressure, as when the fowl to be picked is held in operative position with respect to the elements 24 on the top lap of the belt.

In the construction shown in Fig. 7, I have illustrated a modified form of transverse ribs or projections for the elements and which in said figure bear the numeral 25a. Said ribs or projections generally have a sawtooth-like cross sectional shape. With such a shape, more ribs or projections 25a may be provided in the same length on each element, and this with a better clearance action for the grooves therebetween.

To attach each finger or element to the belt 12, a metal plate 27 may be secured to the base end thereof with each plate being provided with a threaded stud 28. This stud extends through a suitable squared hole 29 in the belt (see Fig. 3) and is of such length as to receive a washer and nut 30. The stud has a squared neck (see Fig. 3) to engage in the square hole 29. When the nut 30 is drawn up tight on the stud, the element is secured to the belt and against turning out of position thereon. When all of the elements are attached to the belt, the ribs or projections 25 and grooves 26 all face in one direction, which is in the direction of the movement of the top lap of the belt as indicated by the arrow in Fig. 1.

If desired, the side frames 10—10 may be provided at that end thereof associated with the cylinder 11 with a guard 31 to prevent an operator, when passing this end of the machine, from engaging the picker elements as the belt moves about this cylinder. Also, a hood 32 (see Fig. 1) may be associated with the cylinder 11a.

Assume that the belt 12 is being driven in the direction of the arrow in Fig. 1 and at the speed before mentioned. With an operator standing at one side of the machine, the fowl which has been previously prepared for plucking as by the semi-scald method, is disposed in the path of the moving picking elements. As the shoulder-like corners of the projections or ribs on the fingers or elements 24 engage the feathers of the fowl, they frictionally grip the feathers and pull them from the skin of the fowl. As the feathers are thus removed, the operator turns the fowl in its position to present new feathered areas to the action of the elements. The feathers thus removed from the fowl are carried along with the belt until they reach the cylinder 11a. When passing about the cylinder, centrifugal action tends to throw the feathers from off the associated end of the machine to be directed by the hood 32, onto the floor or into a receptacle placed to receive the same.

When the operator presents a fowl to the action of the picker elements, he holds the fowl down upon the elements on the top lap of the belt between the cylinders with such pressure as will cause the elements to flex in the direction opposite to that in which they are moving. This will cause the corner edges of the ribs or projections 25 better to grip the shafts and barbs of the feathers so that the quill ends of the shafts are released and pull out of the skin of the fowl. This action takes place at a relatively slight downward pressure on the fowl by the operator, which pressure is not sufficient to cause the inner edges on the ribs or projections 25 from cutting through the feathers to engage the skin at the plucked areas so as to burn or bark the skin.

It will be observed that the disposition of the ribs or projections of the element is in a plane at a right angle to the path of movement of the belt. As said ribs or projections have a substantial width and are substantially straight, they present a good surface area of engagement with the feathers and thus makes them admirably fitted for use in picking ducks and other water fowl whose feathers are not only difficult to pick but which have a considerable amount of underdown thereon.

With the elements having the rectangular cross section apparent from the drawings, they bend in their plucking action across their width and this bend is without an appreciable bulge or other deformation that will start the breaking down of the element.

Of course, the degree of flex of the element under the applied pressure of the fowl to be plucked varies from the base end of the elements to the free or tip end of the elements. As the elements taper from the base end toward the tip end, the flexibility increases from the base end to the tip end and therefore they will readily accommodate such applied pressure as may be imposed upon them.

While in describing my invention, I have referred in detail to the form, arrangement and construction of the various parts thereof, the same is to be considered only in the illustrative sense and therefore I do not wish to be limited thereto except as may be specifically set forth in the appended claims.

I claim as my invention:

1. In a poultry picking machine, a plurality of resilient individual picking elements, each formed with a plurality of projections for engaging and frictionally gripping feathers, means to which one end of each of said elements is attached in spaced relation, and means upon which said first mentioned means is operatively supported while having movement relatively thereto in an endless path, a part of which is relatively straight.

2. In a poultry picking machine, a plurality of resilient individual picking elements each formed with a plurality of projections for engaging and frictionally gripping feathers, endless means to which one end of each of said elements is attached in spaced relation, rotatively mounted members about which said endless means is trained and with which it has a driving relation, and means for driving at least one of said rotatively mounted members.

3. In a poultry picking machine, a plurality of resilient individual picking elements each formed with a plurality of projections for engaging and frictionally gripping feathers, endless means to which one end of each of said elements is attached in spaced relation, rotatively mounted members about which said endless means is trained, means for tensioning said endless means, and means for causing movement of the endless means.

4. In a poultry picking machine, a plurality of resilient individual picking elements each formed with a plurality of projections for engaging and frictionally gripping feathers, endless means to which one end of each of said elements is attached in spaced relation, rotative members about which said endless means is trained and with which it has a driving relation, bearing means for each of said rotatable members and one of which bearing means is adjustable toward or away from the other to tension said endless means, and means causing movement of said endless means.

5. In a poultry picking machine, a plurality of resilient individual picking elements each formed with a plurality of feather engaging projections, endless means to which one end of each of said elements is attached in spaced relation, rotatively mounted members about which said endless means is trained to dispose a portion thereof in substantially a horizontal plane and from which portion said elements extend upwardly, said endless means having a driving relation with said rotatively mounted members, and means for driving at least one of said rotatively mounted members.

6. In a poultry picking machine, an endless belt, rotatively mounted members about which said belt is trained, a plurality of resilient individual picking elements arranged in spaced apart rows extending transversely of the belt, each element being formed with a plurality of frictional feather engaging and gripping projections, and means for causing movement of said endless belt.

7. In a poultry picking machine, an endless belt, rotatively mounted members about which said belt is trained and with which said belt has a driven relation, a plurality of resilient individual picking elements arranged in spaced apart rows extending transversely of the belt, each element being formed with a plurality of frictional feather engaging and gripping projections, bearing means for each of said rotatable members and one of which bearing means is adjustable toward or away from another one of said bearing means to tension said belt, and means for causing movement of said belt.

8. A poultry picking machine embodying therein an endless belt, a plurality of resilient picking elements each having a plurality of feather engaging projections, on the outer surface of said belt, a threaded member engaged with one end of each element and extending through said belt, means on the inner side of the belt and engaged with said end of the threaded member to secure the associated element to said belt, rotatively mounted members about which said belt is trained, said rotatively mounted members each having its periphery formed to receive those parts of said threaded members on the inner side of the belt, and means for causing movement of the belt.

9. A poultry picking machine embodying therein an endless belt, a plurality of resilient picking elements arranged in rows transversely of and disposed upon the outer surface of the belt, each of said elements having a plurality of feather engaging projections thereon, means for securing said elements to said belt and having portions disposed on the inner surface of the belt, rotatively mounted members about which said belt is trained and with which it has a driving relation, said rotatively mounted members each being formed in its periphery to receive said portions of said securing means, and means for driving one of said rotatively mounted members.

10. In a poultry picking machine, a plurality of resilient picking elements each tapering in two directions from the base end toward the tip end, each having a substantially flat surface along one side thereof, a plurality of feather-engaging relatively sharp-cornered projections arranged in spaced relation upon said surface, means to which the base end of said elements are attached for holding said elements in spaced relation, and means for mounting said holding means for movement.

11. In a poultry picking machine, a plurality of resilient rubber picking elements, each having a base end and a tip end and each formed with a plurality of feather engaging projections, a metallic element securely attached to said base end of the element and including a threaded portion, means on which said elements are supported in spaced relation and through which said threaded portion extends, and means mounting said last mentioned means for movement.

12. A picking element for a machine of the kind described, embodying therein an elongated body of resilient material having a plurality of longitudinally extending flat faces, said faces tapering from one end of the body to the other end thereof, and means providing feather engaging projections on at least one of said faces and extending transversely thereof.

13. A picking element for a machine of the kind described, embodying therein an elongated body of resilient material having front and rear faces and opposed sides and which faces taper from one end of the body toward the other end thereof, one of said faces being provided with transversely extending projections, at least toward said other end of the body.

14. A resilient picking element for a machine of the kind described, formed to provide at least one substantially straight face, said face being provided with a plurality of spaced projections, said projections each having a plurality of angularly disposed sides, and presenting at least one corner-like edge.

15. A resilient picking element for a machine of the kind described, formed to provide at least one substantially straight face, said face being provided with a plurality of spaced projections, said projections each having not less than three sides.

16. A resilient picking element for a machine of the kind described, formed to provide at least one substantially straight flat face, said face being provided with a plurality of relatively sharp cornered spaced apart projections, and means carried by one end of said element for attaching it to a movable support.

17. A picking element for a machine of the kind described, embodying therein a solid resilient body portion formed to provide at least one substantially straight flat face, said face being provided with a plurality of relatively sharp cornered spaced apart projections, said body portion tapering in thickness from end to end.

18. A resilient picking element for a machine of the kind described, formed to provide at least one substantially straight face, said face being provided with a plurality of spaced projections, forming relatively sharp cornered feather engaging portions thereon, said element tapering in thickness from end to end.

HAROLD C. CAMPBELL.